United States Patent [19]

Kane

[11] Patent Number: 4,522,085
[45] Date of Patent: Jun. 11, 1985

[54] VARIABLE LOBE CAM MECHANISM

[76] Inventor: Garold L. Kane, 1112 W. Kiowa, Colorado Springs, Colo. 80904

[21] Appl. No.: 412,915

[22] Filed: Aug. 30, 1982

[51] Int. Cl.³ .................... F16H 53/00; F01L 1/34; F16D 1/00; F16B 3/00
[52] U.S. Cl. .................. 74/568 R; 123/90.17; 403/4; 403/359
[58] Field of Search ............ 74/567, 568 R, 568 FS, 74/568 M, 568 T; 123/90.6, 90.17, 90.18, 90.12; 403/359, 4

[56] References Cited

U.S. PATENT DOCUMENTS

| | | | |
|---|---|---|---|
| 3,048,053 | 8/1962 | Howe | 74/567 |
| 3,048,054 | 8/1962 | Heim | 74/567 |
| 3,222,772 | 12/1965 | Leyner | 403/359 |
| 3,477,250 | 11/1969 | Gregorich et al. | 403/359 |
| 3,986,484 | 10/1976 | Dyer | 123/90.18 |
| 4,265,388 | 5/1981 | Takahashi et al. | 403/359 |
| 4,388,897 | 6/1983 | Rosa | 123/90.17 |

FOREIGN PATENT DOCUMENTS

| | | | |
|---|---|---|---|
| 2921645 | 12/1980 | Fed. Rep. of Germany | 123/90.17 |
| 0024274 | 3/1981 | Japan | 74/567 |
| 0167954 | 12/1981 | Japan | 74/567 |
| WO82/02742 | 8/1982 | PCT Int'l Appl. | 123/90.18 |

*Primary Examiner*—Kenneth J. Dorner
*Assistant Examiner*—Vinh Luong
*Attorney, Agent, or Firm*—Dorsey & Whitney

[57] ABSTRACT

A continuously variable cam mechanism designed to change the opening and closing characteristics of the cam operated intake and exhaust valves of an internal combustion engine as a function of engine speed. A cam on the camshaft is split into two adjacent cam pieces forming a single effective cam. The two cam pieces rotate around the camshaft in opposite directions to enlarge or reduce the profile of the combined cam lobe. Each cam piece carries a track follower which engages one of two oppositely directed spiral tracks carried by the camshaft, so that as the camshaft is made to move longitudinally with respect to the longitudinal position of the cam pieces, as a function of engine speed, the cam pieces are rotated about the camshaft in opposite directions.

15 Claims, 8 Drawing Figures

U.S. Patent   Jun. 11, 1985   Sheet 1 of 2   4,522,085
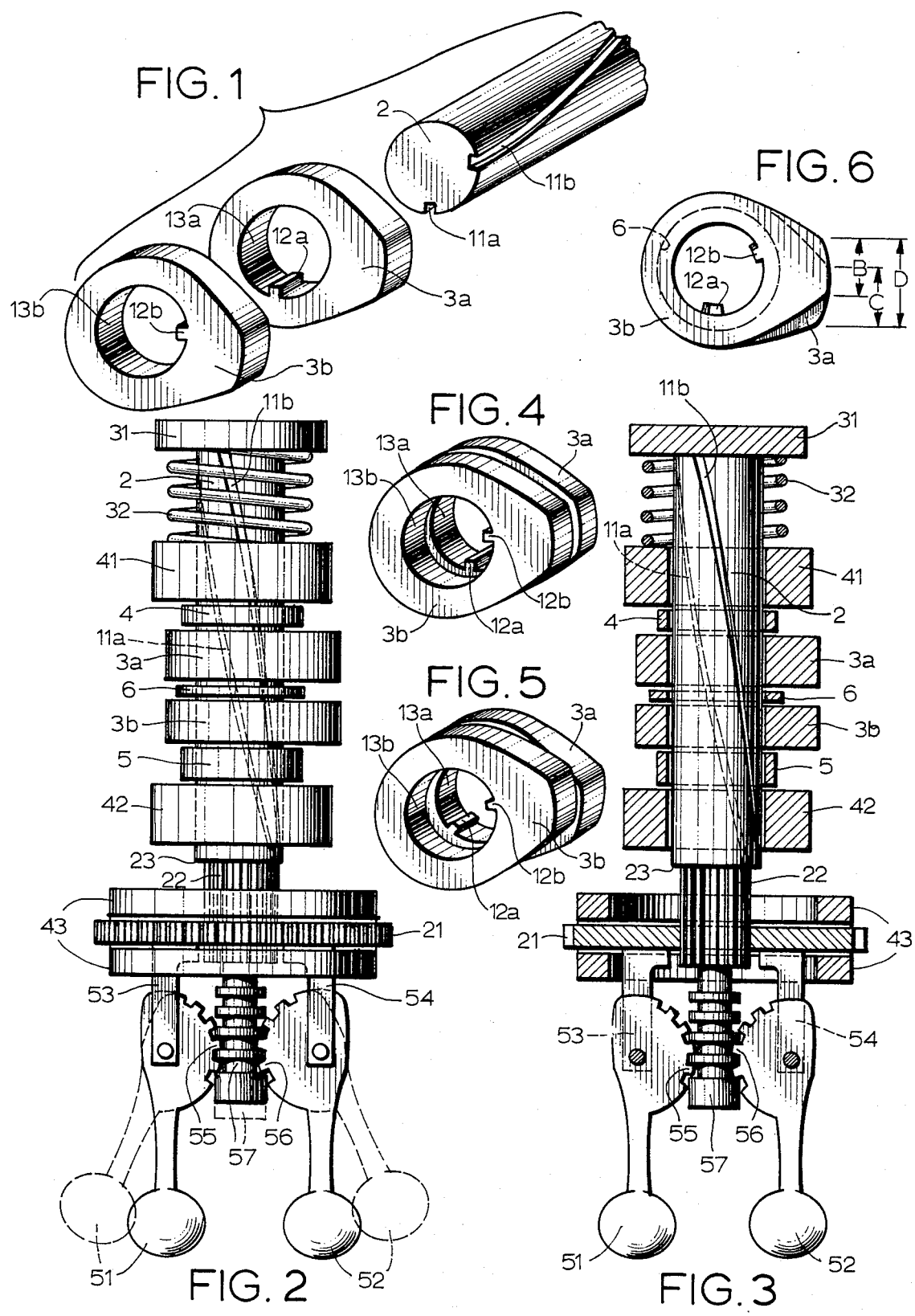

VARIABLE LOBE CAM MECHANISM

BACKGROUND OF THE INVENTION

The present invention relates generally to a variable cam mechanism and more particularly to a mechanism for varying the characteristics of a cam for controlling the opening and closing of valves in an internal combustion engine according to the speed of the engine.

Since the more advanced development of internal combustion engines it has been recognized that greater power outputs and efficiencies can be achieved if intake and exhaust valve operation can be varied as a function of engine speed. The open time duration of a valve, with respect to the cycle time of the piston, is desirably greater at high engine speeds than it is at low engine speeds. One way to accomplish a variation in valve timing in engines where the poppet valves are controlled by the rotative position and contour of cams on a revolving camshaft is to vary the effective width of the lobe of the cam which is responsible for lifting the valve to an open position.

The U.S. Pat. Nos. to Horine and Hellmann, 1,757,046 and 2,888,837, respectively, disclose apparatus relating broadly to variable nose cams for a similar purpose. The more pertinent prior art, however, is found in U.S. Pat. No. 1,175,395 to Wixon, French Pat. No. 1,109.790, and German Pat. No. 2,921,645. These three patents disclose inventions utilizing cam pairs acting in concert to effect a variation in cam lobe width. The French and German patents disclose devices to counterrotate both cams in the pair. The French patent utilizes concentric splined shafts and the German patent utilizes a sliding rod with pins to effect the rotation. Although the Wixon patent discloses a pair of adjacent cams, only one member of the pair is rotatable relative to the camshaft. Further, the cams in Wixon's invention that are rotated, are rotated by means of slot segments on the camshaft, each of which is adapted to only one cam pair. This design, as opposed to the present invention, necessitates the use of keys and limits the possible cam variation.

Although various aspects of these disclosures are similar to the present invention, none of them contains the features necessary to be a practical adjunct to today's production engines.

SUMMARY OF THE INVENTION

The present invention provides for a continuously variable cam mechanism which functions to vary the width of the cam lobes so as to vary and control independently both the opening and closing times of both the intake and exhaust valves of an internal combustion engine as a function of engine speed.

It is well recognized that modern engines ideally require changes in the opening and closing times of both intake and exhaust valves with changes in engine speed. A typical example of such a requirement may be illustrated as follows:

At low engine speeds typical desirable valve timing in relation to piston travel might be:
Intake opens 2° before Top Dead Center
Intake closes 40° after Bottom Dead Center
Exhaust opens 45° before Botton Dead Center
Exhaust closes 6° after Top Dead Center
For high engine speeds a typical desirable valve timing in relation to piston travel might be:
Intake opens 30° before Top Dead Center
Intake closes 70° after Bottom Dead Center
Exhaust opens 65° before Bottom Dead Center
Exhaust closes 30° after Top Dead Center
The change in valve timing, then, for this typical case going from low speed to high speed would be:
Intake opening advances 26°
Intake closing retards 30°
Exhaust opening advances 20°
Exhaust closing retards 24°
If the camshaft runs at half crankshaft speed, as it does in a four-cycle engine, the cam timing change would be half the desired change in valve timing:
Intake cam: advance opening 13° and retard closing 15°
Exhaust cam: advance opening 10° and retard closing 12°

Accordingly, it is a primary object of the present invention to satisfy the modern requirement for a cam which is capable of varying both the opening and closing times of both the intake and exhaust valves of an internal combustion engine independently as a function of engine speed.

Another object of the present invention is to provide apparatus for use with internal combustion engines which will improve engine performance by extending and flattening the torque output as a function of engine speed while at the same time reducing engine emissions and fuel consumption.

A further object of the present invention is to provide a camshaft and variable cam assembly which is easy to produce and assemble while at the same time providing reliability and long service.

Another object of the present invention is to provide a variable contouring cam mechanism which produces smooth transition between the contours of two individual cams which can catch the optimum design requirements for low and high speed engine operation.

Other objects, features and advantages of the present invention will become apparent upon reference to the drawings, the following detailed description of the preferred embodiment and the appended claims.

DESCRIPTION OF THE DRAWINGS

FIG. 1 is an exploded perspective view of two cam bodies forming a cam pair and a portion of the slotted camshaft.

FIG. 2 is an elevational view of the camshaft of the present invention having mounted thereon a single pair of cam bodies for the operation of a single poppet valve, and illustrating the drive gear, the centrifugal rack and pinion assembly, and return spring assembly for moving the camshaft longitudinally.

FIG. 3 is an elevational view, partially in section, of the mechanism of FIG. 2.

FIG. 4 is a pictorial view of two cam bodies forming a cam pair in rotational alignment.

FIG. 5 is a pictorial view of two cam bodies forming a cam pair in rotational displacement.

FIG. 6 is an elevational end view of two cam bodies forming a cam pair in rotational displacement.

DESCRIPTION OF THE PREFERRED EMBODIMENT

Figure 7:
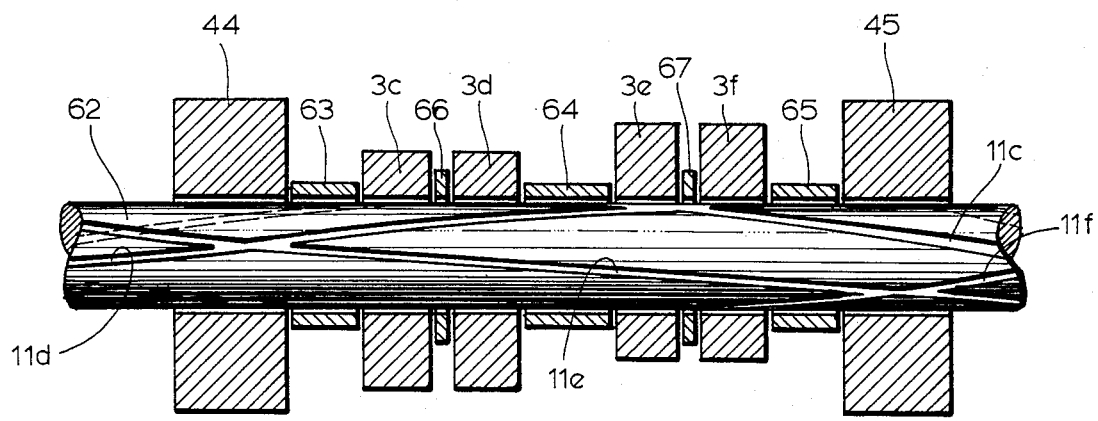
FIG. 7 is an elevational view, partially in section, showing a portion of a camshaft with two pairs of cam bodies mounted thereon.

A simplified single valve operating cam pair and camshaft configuration according to the present invention is shown in FIG. 2, where the camshaft is designated by reference numeral 2. A pair of substantially similar eccentrically projecting cam bodies 3a and 3b are mounted on the camshaft 2 and separated laterally by a thin washer 6. As will be described in greater detail below, each of the cam bodies 3a and 3b is independently rotatable with respect to the camshaft 2. A push rod or other cam follower (not shown) is adapted to span the eccentric surfaces of both cam bodies 3a and 3b so as to follow the outer cam profile generated by the two cam bodies 3a and 3b acting in combination. FIG. 4 illustrates the cam bodies 3a and 3b side by side where their profiles are matched, thus rendering the smallest lobe dimension (dimension B or C in FIG. 6). FIG. 5 also shows the cam bodies 3a and 3b side by side but with the cam bodies 3a and 3b rotated approximately ten degrees with respect to one another, thus creating an effective combined profile having the expanded lobe dimension D in FIG. 6.

One of the improvements inherent in the present invention centers on the means for producing the independent relative rotation of each of the cam bodies 3a and 3b with respect to the camshaft 2 as a function of the rotational speed of the engine. To accomplish this objective, the camshaft 2 is provided with two oppositely directed spiral or diagonal slots 11a and 11b (shown in FIGS. 1, 2 and 3) on the periphery of the camshaft surface and running substantially longitudinally the length of the camshaft. One slot has a left hand spiral, the other a right hand spiral with each having an independent pitch. Different pitches allows the resulting profile of the effective cam lobe at high engine speed to be asymmetric about the centerline of the lobes in their aligned position to permit not only the dwell time to be varied with speed but to also permit the timing of the opening and closing of the valve to be independently adjustable.

As can be seen in FIG. 1, each of the cam bodies 3a and 3b is equipped with a corresponding following means in the form of a cog 12a and 12b, respectively, normal to the plane of the cam body and positioned so as to protrude from the inside surface of the corresponding camshaft receiving bore 13a and 13b. Each of the cogs 12a and 12b is sized and dimensioned to fit within the slots 11a and 11b, respectively, on the camshaft 2 in such a manner as to provide freedom of sliding movement of the cogs in the slots. The function of the cogs 12a and 12b is to follow the corresponding slots 11a and 11b during longitudinal movement of the camshaft 2, thus resulting in rotational movement of the corresponding associated cam bodies 3a and 3b.

In actual practice, it is contemplated that more than one pair of cam bodies will be mounted onto a single camshaft. In such an embodiment, two long spiral slots could accommodate all the cam pairs that require a given timing variation. But, four spiral slots, two right hand and two left hand, are necessary to provide all the opening and closing timing changes for both intake and exhaust valves. An example of such a structure is illustrated in FIG. 7. Should some of the desired timing variations for intake and exhaust be conveniently the same in any application, then one or possibly two of these slots could be eliminated. The drawings for the preferred embodiment show only two slots because that is all that is required for one pair of cam bodies.

In order that longitudinal movement of the camshaft 2 can be translated into opposing rotational motion of the cam bodies 3a and 3b, it is necessary that the cam bodies 3a and 3b be prevented from moving with the camshaft 2 as it changes longitudinal position. As shown in FIGS. 2 and 3, two fixed main bearing blocks 41 and 42 support the camshaft 2. The camshaft 2 is movable longitudinally through the bearings contained within the bearing blocks 41 and 42. The cam bodies 3a and 3b are positioned on the camshaft 2 intermediate the two bearing blocks 41 and 42. A pair of sleeve spacers 4 and 5 position the cam bodies 3a and 3b between the fixed bearing blocks 41 and 42. A thin low friction washer 6 preferably separates the cam bodies 3a and 3b to reduce friction therebetween as the cam bodies 3a and 3b rotate with respect to one another. With the cam bodies 3a and 3b fixed in longitudinal position with respect to the camshaft 2 it is seen that as the camshaft 2 moves longitudinally the opposing spiral slots 11a and 11b and the following cogs 12a and 12b cause the cam bodies 3a and 3b in a cam pair to be angularly displaced from each other. Depending on the direction of the camshaft movement, the cam bodies 3a and 3b will either align themselves as shown in FIG. 4 to form the profile designated by reference dimension B or C in FIG. 6, or will counterrotate with respect to one another as shown in FIG. 5 to form the expanded lobe profile designated by reference dimension C in FIG. 6.

The mechanism for producing longitudinal movement of the camshaft can take many forms, such as a hydraulic piston, a motor driven worm, or others; however, the presently preferred form is a centrifugally controlled rack and pinion device. A straight toothed rack 57 shown in FIGS. 2 and 3 is provided as an extension of the camshaft 2 following a splined section 22. A pair of diametrically mounted pinion half gears 55 and 56 mesh with the teeth of the rack 57. Each of the pinion gears 55 and 56 has an integral arm and attached weight 51 and 52, which weights assume different positions about their centers of rotation as a function of their rotational speed. The phantom line representations of the arms and weights in FIG. 2 show the same in a second position reflecting greater engine speed. The pinion gears 55 and 56 are mounted on a pair of brackets 53 and 54 which are attached to the flat side of the camshaft driving gear 21 which is slidingly attached to the camshaft by the splines 22. The drive gear 21 is held in a fixed longitudinal position by a fixed yoke 43.

It is apparent that as the rotational speed of the driving gear 21 increases and the weights 51 and 52 tend to separate from each other, as shown in FIG. 2, the camshaft 2 will be forced to move longitudinally toward the weights. This in turn causes cam bodies 3a and 3b to counterrotate on the camshaft 2. In order to assure a smooth and effective reversal of direction of movement of the camshaft when the speed of drive gear 21 decreases, a coil compression spring 32 surrounds the camshaft and is disposed between the bearing block 41 and a flange 31 attached to the camshaft 2. As the camshaft is moved during increasing rotational speed toward the weights 51 and 52, the spring 32 is compressed between the bearing block 41 and the flange 31, developing a return bias force which returns the shaft to its low speed position as the pulling force of the rack and pinion device is reduced.

In addition to the return bias, the spring 32 provides a pre-load counter force to the centrifugal mechanism which determines the engine speed at which the centrifugal mechanism begins to take effect. Longitudinal motion of camshaft 2 is limited by a jambing of the rack 57 and pinions 55 and 56 in one direction (as illustrated by the solid lines in FIG. 2), and by the shoulder 23 on camshaft 2 butting the drive gear 21 in the other direction.

In the preferred embodiment of the present invention the spiral slots extend the length of the camshaft so that the cam bodies 3a and 3b, the spacers 4 and 5, the washer 6 and the bearing blocks 41 and 42 can easily be assembled on the camshaft by sliding them on in order from the end of the camshaft. This obviates the necessity to use keys or other separate connecting elements to join the cam bodies 3a and 3b to the camshaft 2 after the cam bodies 3a and 3b are in place. With the structure of the preferred embodiment, the cogs 12a and 12b can be secured to or integrally formed with the respective bores 13a and 13b of the cam bodies 3a and 3b prior to being assembled on the camshaft 2.

The embodiment of the invention described above is shown for simplicity's sake to include only one pair of cam bodies to operate only one valve. However, it is anticipated that for practical purposes a plurality of cam pairs and four spiral slots be provided on the same shaft for operating a number of intake and exhaust valves, as is found on most four-cycle internal combustion engines. Such an embodiment is illustrated in FIG. 7 which shows a portion of a camshaft 62 including two pairs of cam bodies 3c and 3d, 3e and 3f, two washers 66 and 67, two bearing blocks 44 and 45 and sleeve spacers 63, 64 and 65 to position the cam bodies on the camshaft 62 between the bearing blocks 44 and 45. This camshaft also shows four spiral slots 11c, 11d, 11e and 11f (two right hand, 11c and 11e, and two left hand, 11d and 11f) to control the angular movement of the cam bodies 3c, 3d, 3e and 3f, respectively.

Another alternative construction to the preferred embodiment would be to have two diametrically opposed cogs instead of just one in each cam body with two corresponding opposing spiral slots on the camshaft. This construction would involve eight spiral slots altogether in a normal application but would tend to insure that a force couple would act on the cam bodies to more effectively rotate the cam bodies.

A further alternate construction to the preferred embodiment would be to provide ball type thrust bearings or other low friction bearings in the yoke 43 and bearing blocks 41 and 42 to receive the longitudinal loading of the gear drive 21, spring 32 and sleeve spacers 4 and 5.

Figure 8:
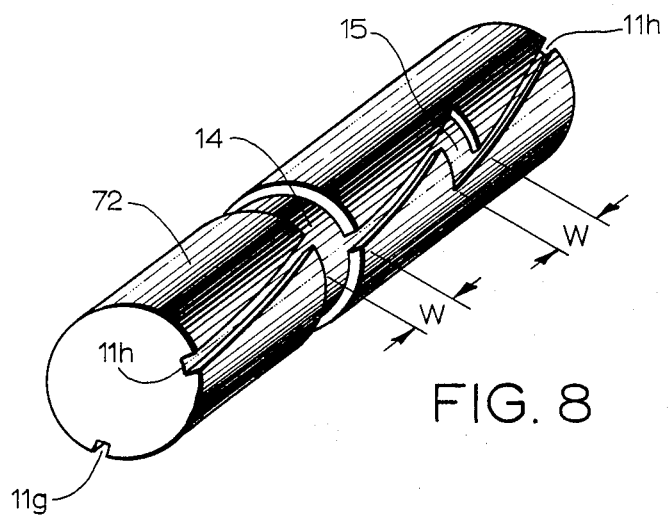
FIG. 8 is a pictorial view of a portion of a camshaft where the slots have been staggered.

A still further alternate construction to the preferred embodiment would be to stagger the spiral slot as shown in the two examples in FIG. 8. Slot 11h forms a zig-zag pattern with wide depressed bands 14 and 15 on the camshaft 72 at the discontinuities of the path of the slot 11h. The bands 14 and 15 are the same depth as slot 11h. The first band 14 completely encircles the camshaft 72. The second band 15 merely joins the two otherwise disjoint ends of slot 11h. These bands are intended to allow the cog track followers in the cam bodies to move freely from the end of one of the continuous sections of slot 11h to another during assembly. Hence the band width W should be at least equal to the length of the cog. This design allows the slot 11h to be angularly positioned arbitrarily at selected points on the camshaft 72 to accommodate a predetermined cog placement with respect to the cam lobe in the cam body. Alternatively, it could be used to prevent the slots 11g and 11h from crossing.

Still a further alternate construction to the preferred embodiment would be to construct the cogs so they pivot about a camshaft radius. This would allow for gentle changes in slot pitch along the length of the camshaft without binding the cog. It would also allow one cam body to be used in slots having different pitches. Pins in place of cogs could also be used to accomplish these things.

Although the description of the preferred embodiment has been quite specific, it is contemplated that various changes could be made without deviating from the spirit of the present invention. Accordingly, it is intended that the scope of the present invention be dictated by the appended claims rather than by the description of the preferred embodiment.

I claim:

1. A continuously variable lobe cam mechanism for controlling the opening and closing of valves in an internal combustion engine comprising:

a camshaft having first and second oppositely directed and independently pitched slots running generally longitudinally to said camshaft on the periphery thereof;

a cam member having a cam surface and mounted on said camshaft for rotation therewith, said cam member adapted for longitudinal movement relative to said camshaft and comprising first and second cooperating cam bodies which are maintained in fixed axial position with respect to one another, each of said cam bodies being axially fixed with respect to one another and forming a portion of said cam surface and each of said cam bodies being adapted for independent limited rotational movement in opposite directions relative to said camshaft in respone to longitudinal movement of said camshaft relative to said cam bodies, each of said cam bodies further having a generally cylindrical bore extending therethrough;

first and second following means connected respectively with first and second cam bodies and being respectively slidably disposed in said first and second slots to provide opposing relative rotations of said cam bodies upon movement of said first and second following means within the respective first and second slots said first and second following means extending inwardly from the surface of said cylindrical bore of its respective first and second cam body for engagement with said first and second slot;

rotational drive means operatively attached to said camshaft; and means operatively attached to said camshaft for moving said camshaft longitudinally with respect to said cam member as a function of the rotational speed of said camshaft.

2. The mechanism of claim 1 including camshaft bearing means disposed on opposite sides of said cam member for maintaining said cam member in a fixed axial position relative to said bearing means.

3. The mechanism of claim 2 wherein said rotational drive means includes a drive gear longitudinally slidably mounted on said camshaft.

4. The mechanism of claim 3 wherein said means for moving said camshaft longitudinally includes:

a toothed rack attached to said camshaft;

at least one pinion gear meshed with said rack; and rotational speed responsive means connected with said drive gear for rotational movement therewith and coupled to said pinion gear.

5. The mechanism of claim 4 further including camshaft counter force means having spring means applying longitudinal force to said camshaft in one direction.

6. The mechanism of claim 1 wherein said first and second slots are generally spiral slots.

7. The mechanism of claim 6 wherein said first and second slots extend to at least one end of said camshaft.

8. The mechanism of claim 7 wherein said first and second following means includes a cog fixed to said first and second cam bodies respectively.

9. The mechanism of claim 1 having at least two pairs of cam bodies rotatably mounted on said camshaft.

10. The mechanism of claim 9 having at least four independently pitched slots running generally longitudinally to said camshaft on the periphery thereof.

11. The mechanism of claim 10 wherein each of said slots extends to at least one end of said camshaft.

12. The mechanism of claim 10 including camshaft bearing means disposed on opposite sides of said cam member for maintaining said cam member in a fixed axial position relative to said bearing means.

13. The mechanism of claim 11 wherein said slots are generally spiral slots.

14. The mechanism of claim 1 wherein each of said slots includes at least two longitudinally spaced slot sections connected by a reduced radius portion of said camshaft, said slot sections and reduced radius portion of said camshaft, said slot sections and reduced radius portion defining a slot path extending to at least one end of said camshaft.

15. The mechanism of claim 14 wherein said reduced radius portion includes a band portion extending around the entire circumference of said camshaft.

* * * * *